(No Model.)

E. R. GILBERT.
RHEOSTAT.

No. 439,939. Patented Nov. 4, 1890.

Attest:
L. Lee.
F. C. Fischer.

Inventor.
Edwin R. Gilbert, per
Crane & Miller, Attys.

UNITED STATES PATENT OFFICE.

EDWIN RANDOLPH GILBERT, OF HARTFORD, CONNECTICUT.

RHEOSTAT.

SPECIFICATION forming part of Letters Patent No. 439,939, dated November 4, 1890.

Application filed August 21, 1890. Serial No. 362,601. (No model.)

*To all whom it may concern:*

Be it known that I, EDWIN RANDOLPH GILBERT, a citizen of the United States, residing at Hartford, Hartford county, Connecticut, have invented certain new and useful Improvements in an Electrical Resistance, fully described and represented in the following specification and the accompanying drawings, forming a part of the same.

The object of this invention is to furnish a cheap and efficient construction for an electrical resistance and to combine a series of such resistances cheaply into a rheostat.

By my invention the cost of the materials is reduced in a remarkable degree, and as the materials are all of a refractory character the resistances are not liable to injury if heated by heavy currents. The material for the resistance is used in powdered form, which requires confinement in a case of non-conducting material, and the degree of resistance in the material is varied by mixing conductive and non-conductive substances in the required proportions. The materials I employ are iron-dust and a non-conducting powder, as carbonate of magnesia or lime. The carbonate of magnesia is the most refractory non-conductor known to me, and is therefore preferred in forming my composition. A tube three inches long and three-quarter inch diameter filled with such mixture in the proportion of thirty-two parts of iron to one part of the carbonate gives twelve and one-half ohms resistance and will carry a current of fifteen ampères. A box containing eight such tubes gives one hundred ohms resistance, and other degrees of resistance may be secured by increasing or diminishing the proportion of carbonate to the iron. The iron-dust is a natural product in milling and working cast-iron, and may be bought for a few cents per pound, and as the magnesium carbonate is used in very small proportions the cost of the entire materials in a rheostat of one hundred ohms does not exceed six or seven cents. The tubes or cases for containing the resistance I form of asbestus paper or fabric, as this material is not only cheap, but refractory to heat in a high degree, and I inclose a series of such tubes in a box of any strong material and connect them in a suitable manner with contact-studs and a lever to throw one or more of them into the electric circuit.

The invention will be understood by reference to the annexed drawings, in which—

Figure 2:
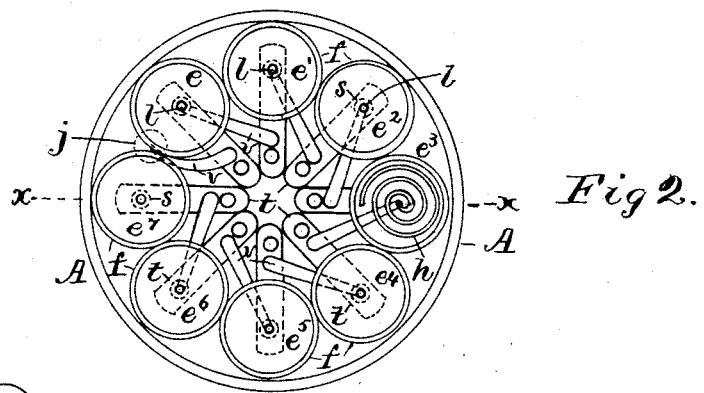
Figure 3:
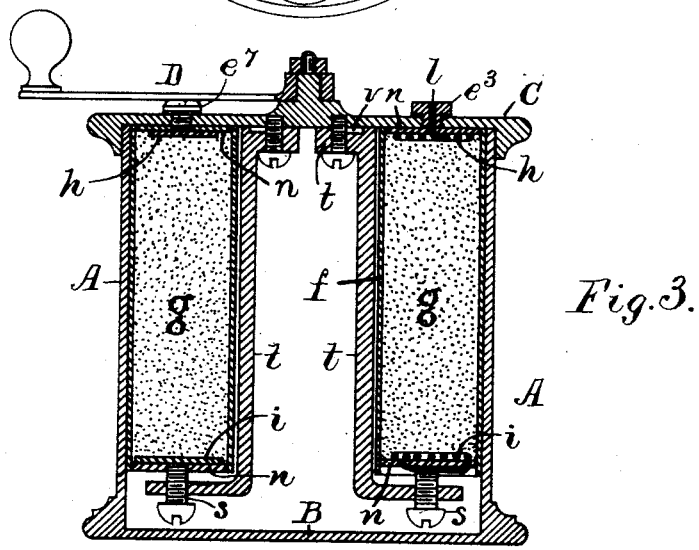
Figure 1:
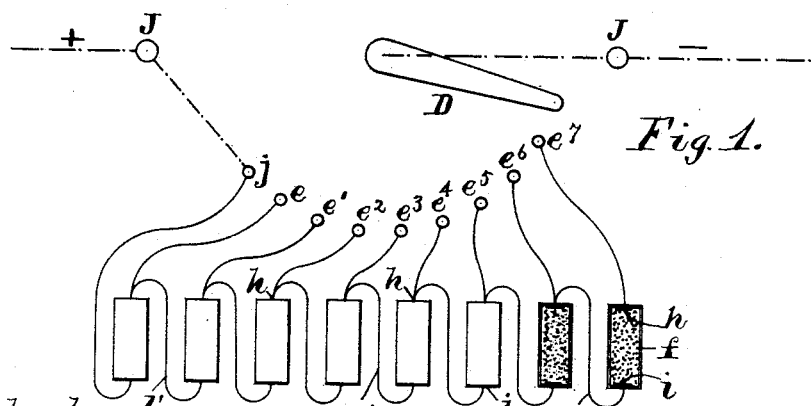

Figure 1 is a diagram showing the electrical connections for a series of the resistances. Fig. 2 is a plan of a circular resistance-box with the cover removed to expose the tubes and wire-connections, and Fig. 3 is a vertical section at the center of such resistance-box on line $x\ x$ in Fig. 2.

A is the cylinder of the box, shown with solid bottom B and removable cover C, upon which the switch-lever D and contact-studs are arranged in the usual manner.

$f$ are tubes of asbestus paper; $g$, the mixture of resistance material with which they are filled; $h$, the metallic connections at the top ends of the tubes in contact with the material, and $i$ the connections at the bottom end.

The box is shown filled with eight tubes or asbestus cases, and the upper ends of the tubes are connected separately to the studs, while another stud $j$ and the lever D would be connected with binding-posts J for making connection with the electrical circuit, as shown in Fig. 1. The diagram in this figure shows the usual electrical connections for a rheostat, the studs $e$ to $e^7$, inclusive, being connected to the tops of the several resistances, and the top of each resistance being also connected separately with the bottom of the adjacent resistance or tube by a wire $l'$.

The resistance-powder in my invention is not subjected to a special degree of pressure to make it perform its functions, but is packed in the tubes closely without any cement or other means of holding its particles into a particular relation with one another. The powder is held in the tube, and the tube clamped to the cover C (to facilitate construction and repairs) by a screw $s$ inserted through the lower end of a bracket $l$, secured to the cover by the side of each tube. The bracket is in electrical connection with the lower end of the clamped tube through the contact of the screw $s$ with a metallic contact-piece embedded in the powder, and the foot of the bracket is also in connection with the upper end of the adjacent tube, the bracket serving the same function as the wires $e'$. (Shown in Fig. 1.)

In Fig. 3 the studs $e^3$ and $e^7$ are shown upon the cover C, being in practice insulated therefrom and connected with the upper ends of their respective resistances by suitable connections $l$. The metallic connections or contacts $h$ or $i$ are shown at the left side of Fig. 3 formed of metal disks; but at the right side of the same figure the metallic connection with the resistance-powder is formed by coiling the wire into a spiral and embedding the same in the powder at the end of the tube.

It is immaterial how the electrical connection be made at the ends of the resistance-powder in the tube.

In Fig. 3 disks of insulating material $n$, fitted snugly to the interior of the tube, are shown inserted in the extreme ends of the tubes to retain the powder in place and to insulate the same from the cover or adjacent parts, the wire $l$, attached to the upper contact $h$, being carried through a hole in such disk and extended to the switch-stud upon the cover. At the right side of Fig. 3 the wire from the contact $i$ is carried through a hole in such disk and clamped by the screw $s$ to make an electrical connection therewith. At the left side of Fig. 3 the screw $s$ is shown inserted through the insulating-disk in contact with the metal disk $i$.

In Fig. 3 small tongues $v$ are shown clamped between the feet of the brackets $t$ and the cover C, such tongues being formed upon the ends of wires shown at $v$ in Fig. 2, which forms the serial connections between the several resistances, being carried from the foot of each bracket to the metallic contact $h$ in the top of the adjacent resistance. In Fig. 2 the studs are not shown, as the cover is removed; but the stud $j$, representing a connection with the electric circuit, is indicated by a dotted line and connected with one of the brackets by the tongue or strip $v$. The tops of the several resistance-tubes are, however, lettered $e$ to $e^7$, inclusive, in correspondence with the contacts shown in Fig. 1, and the strips or tongues $v$ connect such tubes in the same relation as is indicated by the wires $l'$ in Fig. 1.

I am aware that a block of resistance composition has been combined with caps at opposite ends, and that powdered composition has been used as a resistance with means to compress the powder for adjusting the degree of resistance to a given standard. As carbonate of magnesia is produced by precipitation, its powder is quite impalpable, and forms a thin film over each particle of iron when the ingredients are intimately mixed, and the resistance formed by my mixture is thus much more uniform in character than one produced by merely pulverized ingredients. The powdered composition may therefore be prepared, inserted in the tubes, and provided with its metallic connections with much less care than is required with previous constructions.

By the use of an impalpable powder, like carbonate of magnesia, mingled with a good conductor like iron particles, I am enabled to form a composition in a loose powder with an entirely uniform resistance, and thus avoid the provision of means for compressing the powder. I also avoid the expense of forming the composition into a block. My entire construction thus furnishes a very refractory and uniform resistance at a very low cost. A rheostat by my construction is also smaller in dimensions than those in common use with the same resistance.

The asbestus casing shown in my construction and the materials used for the powder being refractory are not injured by overheating, and the durability of the construction is thus insured.

As the composition of iron-dust and magnesium carbonate possesses the especial merits described above, I do not limit myself exclusively to the means shown herein for combining it in an electrical resistance.

It is obvious that other powdered metals, as brass or copper, would perform precisely the same function in my construction as iron-dust, and would therefore be a precise mechanical equivalent therefor. I have therefore claimed the magnesium carbonate in combination with such powdered metal and also the asbestus tubes, as these features are of special value in the construction, which is owing to their property of resisting heat in a high degree.

Having thus set forth my invention, what I claim, and desire to secure by Letters Patent, is—

1. An electrical-resistance composition consisting in a mixture of powdered metal and magnesium carbonate.

2. An electrical resistance consisting in a tube of asbestus fabric, a filling of resistance composition in powdered form within the tube, and metallic conductors in contact with the powder in the opposite ends of the tube.

3. An electrical-resistance composition containing powdered iron and magnesium carbonate.

4. An electrical resistance consisting in powdered iron and magnesium carbonate confined in a tube or case of asbestus fabric.

5. An electrical resistance consisting in a tube of asbestus fabric, a composition of powdered iron and magnesium carbonate inclosed in such tube, and metallic conductors in contact with the powder in the opposite ends of the tubes, substantially as herein set forth.

6. A rheostat consisting in a box or casing containing a series of asbestus tubes filled with a mixture of powdered iron and magnesium carbonate, the powder in the tops of the tubes being connected, respectively, with contact-studs upon the exterior of the box, and also with the bottom of the adjacent tube, and a lever being provided and binding-posts to connect the resistances with an electric circuit, substantially as herein set forth.

In testimony whereof I have hereunto set my hand in the presence of two subscribing witnesses.

EDWIN RANDOLPH GILBERT.

Witnesses:
    ARTHUR K. BROCKLESBY,
    CHAS. E. GILBERT.